United States Patent
Ettl et al.

(10) Patent No.: US 9,626,646 B1
(45) Date of Patent: Apr. 18, 2017

(54) DISTRIBUTED OPTIMIZATION METHOD FOR REAL-TIME OMNICHANNEL RETAIL OPERATIONS

(71) Applicant: International Business Machines Corporation, Armonk, NY (US)

(72) Inventors: Markus R. Ettl, Ossining, NY (US); Pavithra Harsha, White Plains, NY (US); Shivaram Subramanian, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/951,966

(22) Filed: Nov. 25, 2015

(51) Int. Cl.
*G06Q 10/00* (2012.01)
*G06Q 10/08* (2012.01)
*G06Q 30/02* (2012.01)

(52) U.S. Cl.
CPC ....... *G06Q 10/087* (2013.01); *G06Q 30/0206* (2013.01)

(58) Field of Classification Search
CPC .................................. G06Q 30/0206
USPC ....................................... 705/7.35
See application file for complete search history.

(56) References Cited

U.S. PATENT DOCUMENTS

| | | | |
|---|---|---|---|
| 660,882 A | 10/1900 | Barnes | |
| 8,386,298 B2 | 2/2013 | Bai et al. | |
| 8,660,882 B2 | 2/2014 | Bai et al. | |
| 2015/0100384 A1 | 4/2015 | Ettl et al. | |
| 2016/0283953 A1 | 9/2016 | Ettl et al. | |

OTHER PUBLICATIONS

Danny Knopp, Omnichannel Inventory Optimization: Where Are My Products?, The Parker Avery Group, GA, United States.
Acimovic, et al. "Making Better Fulfillment Decisions on the Fly in an Online Retail Environment," Feb. 25, 2014, 32 pages.
Ho "Computing True Shadow Prices in Linear Programming." Informatica, 2000, vol. 11, No. 4, pp. 421-434.
O'Neill, et al. "Efficient market-clearing prices in markets with nonconvexities," European Journal of Operational Research, vol. 164 (2005), pp. 269-285.
Subramanian, et al. "An Effective Deflected Subgradient Optimization Scheme for Implementing Column Generation for Large-Scale Airline Crew Scheduling Problems," INFORMS Journal of Computing, (2006), 28 pages.
U.S. Appl. No. 15/154,285, filed May 13, 2016, entitled "Modeling Inventory Performance for Omni-Channel Fulfillment in Retail Supply Networks."

*Primary Examiner* — Hunter Wilder
(74) *Attorney, Agent, or Firm* — Cantor Colburn LLP; Keivan Razavi

(57) ABSTRACT

Embodiments are directed to a computer implemented method of generating inventory valuation data for an omnichannel (OC) retail operation. The method starts with an unsolvable OC nonlinear nonconvex problem, applies transformations to generate a mixed-integer program (MIP) that is a tractable linear nonconvex form, solves the MIP, fixes prices at optimal values to achieve dimensionality reduction and eliminate all non-convexity by eliminating the pricing dimension. The method further obtains inventory flow linear programming (LP) that is linear convex, and solves the LP to recover a dual solution as initial inventory valuations.

13 Claims, 7 Drawing Sheets

INVENTORY VALUATION TOOLS: DEMAND FORECAST DATA
WHEN PRICES ARE FIXED

THE DETERMINISTIC INVENTORY OPTIMIZATION LP GIVEN MARKDOWN PRICES IS AS FOLLOWS. BELOW INDEX
j REFERS TO FCs AND A HYPOTHETICAL WAREHOUSE w WHICH TRANSSHIPS SFS ITEMS

| | | DUALS: VALUE OF INVENTORY |
|---|---|---|
| REVENUE (INCLUDES SALVAGE) | $\text{MAXIMIZE}_{s,w} \quad \sum_{l,t}\left[p^b_{lt}s^b_{lt} + \sum_j p^o_t s^{oW}_{jlt}\right] + q\left(\sum_j w^o_j + \sum_l w^b_l\right)$ | |
| COST: SHIPPING, TRANSPORTATION | $-\sum_{j\in FC, l, t} c^W_j s^{oW}_{jlt} - \sum_{l,l',u} c_u \cdot s^{oSb}_{ll'}$ | |
| ONLINE SALES LESS THAN DEMAND, INVENTORY + SFS | SUBJECT TO. $\quad \sum_j s^{oW}_{jlt} \leq D^o_{lt}(P_{lt}) \qquad \forall\, l,t$ | ----- $A^o_{lt}$ |
| | $\sum_t s^{oW}_{wlt} = \sum_{l'} s^{oSb}_{l'l} \qquad \forall\, l$ | ----- $B^o_l$ |
| | $\sum_{l,t} s^{oW}_{jlt} + w^o_j = I_{oj} \qquad \forall\, j \in FC$ | ----- $\boxed{E^o_j}$ AT EFC j |
| BRICK SALES LESS THAN DEMAND AND INVENTORY - SFS | $s^b_{lt} \leq D^b_{lt}(P_{lt}) \qquad \forall\, l,t$ | ----- $A^b_{lt}$ |
| | $\sum_t s^b_{lt} + \sum_{l'} s^{oSb}_{ll'} + w^b_l = I_{bl} \qquad \forall\, l$ | ----- $\boxed{E^b_l}$ AT location l |

$s, w \geq 0$

FIG. 4

COLUMN GENERATION SCHEME FOR UPDATING
OMNI-CHANNEL DUALS / VALUE OF INVENTORY

INITIALIZATION OF SHADOW PRICES AND PREPROCESSING OF COLUMNS
    CREATE AN ACTIVE SET SFS(k) OF SHIP-FROM-STORE VARIABLES BASED ON DISTANCE AND AVAILABILITY INITIALIZE E = 0 ($E^0_j$ = 0, $E^b_l$ = 0) k = 1 (WE CAN ALSO WARM-START WITH BEST PRIOR ESTIMATE) CONSTRUCT LAGRANGE RELAXATION LR
        DUALIZE THE INVENTORY CONSTRAINTS BY INCORPORATING WITHIN THE OBJECTIVE FUNCTION VIA LANGUAGE MULTIPLIERS (E) LR DECOMPOSES INTO SIMPLE BOUND-CONSTRAINED PROBLEMS SEPARABLE BY CHANNEL-LOCATION-TIME PERIOD

COLUMN GENERATION AND PRICING
    COMPUTE REDUCED COST FOR BRICK SALES, SFS(k), AND EFC FLOW VARIABLES
        THIS PRICING CAN BE PERFORMED USING DISTRIBUTED COMPUTING FOR LARGE INSTANCES
    THE CHANNEL SALES AT ANY LOCATION AND TIME IS EITHER = 0 OR PREDICTED DEMAND FOR THAT TIME PERIOD SOLVE LR. COMPUTE THE RESULTANT OBJECTIVE $L_k$. RECORD THE BEST (LOWEST) VALUE L* SO FAR

COMPUTE INVENTORY CONSTRAINT VIOLATIONS (NEGATIVE SUBGRADIENTS)
    COMPUTE THE RESULTANT INVENTORY VIOLATION ERROR VECTOR $d_k$ (= $d_j$ AT EFCs j, AND $d_l$ AT STORE LOCATIONS l) COMPUTE DEFLECTED SUBGRADIENT $g_{k+1} = \alpha d_k + (1-\alpha) g_k$, WHERE $\alpha$ IS IN ALGORITHMIC PARAMETER
        OPTIONAL: OBTAIN PRIMAL ESTIMATES $s^*_{k+1} = \alpha s_k + (1-\alpha) s^*_k$ UPDATING THE DUAL VECTOR E
    $E^{k+1} = E^k + 2\alpha(\Theta - L^*) g / ||g||^2$, WHERE $\Theta$ IS A CAREFULLY CHOSEN TARGET VALUE (REF: IJOC 2006) PROJECT $E^{k+1}$ ONTO ITS BOUNDS (TIGHTENED USING OMNI-CHANNEL PRICES) TO PRESERVE DUAL FEASIBILITY.
    k = k+1.

TERMINATION
    STOP WHEN g IS SMALL, OR TIME LIMIT EXPIRES, AND RETURN $E^k$ AS THE BEST SHADOW PRICE ESTIMATE.
        OPTIONAL: FOR MAXIMUM ACCURACY, ALL SFS VARIABLES MUST BE PRICED PRIOR TO TERMINATION

FIG. 5

| REVENUE COMPONENT | EXISTING FEATURE | DEMAND FORECAST DATA - SHADOW PRICE |
|---|---|---|
| MARKDOWN SAVINGS (MEDIUM RISK) | ON-OFF BINARY TOGGLE | AUTOMATICALLY UPDATES FULL EFFECT OF MARKDOWNS |
| LOST BRICK SALES (HIGH RISK) | AD-HOC MINIMAL SAFETY STOCK | HIGH SHADOW PRICE = TRUE VALUE OF LOST SALE |
| CHANNEL MARGIN LEAK (MEDIUM RISK) | NONE | PRESERVES HIGH-VALUE BRICK REVENUE |

FIG. 6

DISTRIBUTED OPTIMIZATION METHOD FOR REAL-TIME OMNICHANNEL RETAIL OPERATIONS

BACKGROUND

The present disclosure relates in general to the computer-based management of retail operations. More specifically, the present disclosure relates to systems and methodologies for providing distributed computations that support dynamic inventory valuation in real-time omnichannel retail operations.

The internet and a variety of wired and wireless mobile technologies have significantly impacted the ways in which retailers interface with their actual and potential customers. For example, the phrase "brick-and-mortar" is used to describe a business that is located in a building as opposed to an online shopping destination, door-to-door sales, a kiosk or other similar sites not housed within a structure. Brick-and-mortar operations traditionally dealt with their customers face to face in an office or store. As a response to their online-only competitors, many brick-and-mortar retailers began to offer merchandise for sale through the retailer's website, thus offering customers the option of purchasing through the same type of online mail-order channel provided by online-only retailers. As a result, major retailers now engage their customers and execute transactions across multiple channels.

From the supply-chain perspective, these retailers have, in addition to adding e-commerce fulfilment centers, started to employ the logistical concept of "ship-from-store" (SFS) that uses inventory located at a brick-and-mortar store to fulfil e-commerce orders for a product originating at any location. Consequently, the store inventory is scarce resource shared by several sales channels. This poses at least two new challenges for such retailers. First, their revenue management system must take into account this SFS fulfilment logic. Second, and more important, these retailers must decide in real-time the most profitable store location from which to deplete inventory in order to meet an incoming e-commerce order.

The phrase "omnichannel retailing" or "multichannel retailing" is used to describe retail operations that offer merchandise for sale through a variety of channels in a customer's shopping experience, including conducting research before a purchase, visiting brick-and-mortar stores, browsing online stores, browsing mobile application (i.e., "app") stores, making telephone purchases and any other method of transacting with a retailer. Providing customers with the ability to purchase merchandise across multiple channels presents a new and significant management challenge for retailers. A variety of computer-based systems have been developed to support the performance of traditional retail functions in an omnichannel environment. For example, there now exist omnichannel revenue management systems (OC-RMSs) that analyze different variables (e.g., forecasted demand) over different channels covering a future time period to optimize prices and inventory over that time period. The OC-RMS calculated purchase price of a product, and thus the valuation of inventory, is not a fixed value but can vary considerably over time, as well as the fulfillment locations and the sales channels. There also exist omnichannel real time applications (OC-RTAs) (e.g., warehouse and order management/fulfillment systems) that manage time-sensitive, short term retail operations such as order fulfillment, product recommendations, etc. in an omnichannel environment.

A typical OC-RTA, such an e-commerce fulfilment application, fills a given order from a location that is chosen to minimize cost-to-serve and lost revenue OC-RTAs track costs accurately but are not fully revenue aware, which leads to margin leak and lost brick sales. It would be beneficial for retailers to have the capability to generate their OC-RMS inventory valuation data in real time in order to effectively and efficiently integrate such real time omnichannel inventory valuation data into OC-RTAs. However, the large scale nonlinear, nonconvex planning models of a typical OC-RMS make the extraction of real time, demand driven inventory valuation data from an OC-RMS complicated, resource intensive and time consuming.

There is no known system that efficiently and cost effectively extracts real time inventory valuation data from an OC-RMS, nor is there a known system that efficiently and effectively integrates such real time inventory valuations into the dynamic and real-time operating environment of an OC-RTA.

SUMMARY

Embodiments are directed to a computer implemented method of generating inventory valuation data for an omnichannel (OC) retail operation. The method includes generating, using a processor system, an OC non-linear demand-driven inventory pricing model having pricing and inventory decision variables and covering a first predetermined time period. The method further includes reformulating the OC non-linear demand-driven inventory pricing model to transform all nonlinear price responses within the OC non-linear demand-driven inventory pricing model into a mixed-integer program (MIP) formulation. The method further includes solving the MIP formulation numerically to generate numerical price values and setting values of the pricing decision variables equal to the numerical price values to eliminate non-convexity and reduce dimensionality of the OC non-linear demand-driven pricing model into a linear programming problem. The method further includes applying, using the processor system, a linear programming solver to the linear programming problem to recover initial valuations of inventory at every location of every channel of the OC retail operation. The method further includes, based at least in part on changes to inventory of the OC retail operation, updating the initial valuations of inventory at every location of every channel of the OC retail operation.

Embodiments are further directed to a system for generating inventory valuation data for an OC retail operation. The system includes a processor system configured to generate an OC non-linear demand-driven inventory pricing model having pricing and inventory flow decision variables and covering a first predetermined time period. The processor system is further configured to reformulate the OC non-linear demand-driven inventory pricing model to transform all nonlinear price responses within the OC non-linear demand-driven inventory pricing model into a MIP formulation. The processor system is further configured to solve the MIP formulation numerically to generate numerical price values and set values of the pricing decision variables equal to the numerical price values to eliminate non-convexity and reduce dimensionality of the OC non-linear demand-driven pricing model into a linear programming problem. The processor system is further configured to apply a linear programming solver to the linear programming problem to recover initial valuations of inventory at every location of every channel of the OC retail operation. The processor system is further configured to, based at least in part on changes to inventory of the OC retail operation, update the initial valuations of inventory at every location of every channel of the OC retail operation.

Embodiments are further directed to a computer program product for generating inventory valuation data for an OC retail operation. The computer program product including a computer readable storage medium having program instructions embodied therewith, wherein the computer readable storage medium is not a transitory signal per se. The program instructions are readable by a processor system to cause the processor system to perform a method. The method includes generating, using the processor system, an OC non-linear demand-driven inventory pricing model having pricing and inventory decision variables and covering a first predetermined time period. The method further includes reformulating the OC non-linear demand-driven inventory pricing model to transform all nonlinear price responses within the OC non-linear demand-driven inventory pricing model into a MIP formulation. The method further includes solving the MIP formulation numerically to generate numerical price values and setting values of the pricing decision variables equal to the numerical price values to eliminate non-convexity and reduce dimensionality of the OC non-linear demand-driven pricing model into a linear programming problem. The method further includes applying, using the processor system, a linear programming solver to the linear programming problem to recover initial valuations of inventory at every location of every channel of the OC retail operation. The method further includes, based at least in part on changes to inventory of the OC retail operation, updating, using the processor system, the initial valuations of inventory at every location of every channel of the OC retail operation.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 4 depicts details of the operation of an inventory valuation tool according to one or more embodiments of the present disclosure;

FIG. 5 depicts additional details of the operation of an inventory valuation tool according to one or more embodiments of the present disclosure;

FIG. 6 depicts a table that summarizes the impact of demand-driven inventory valuation data on different revenue components according to one or more embodiments of the present disclosure.

Figure 1:
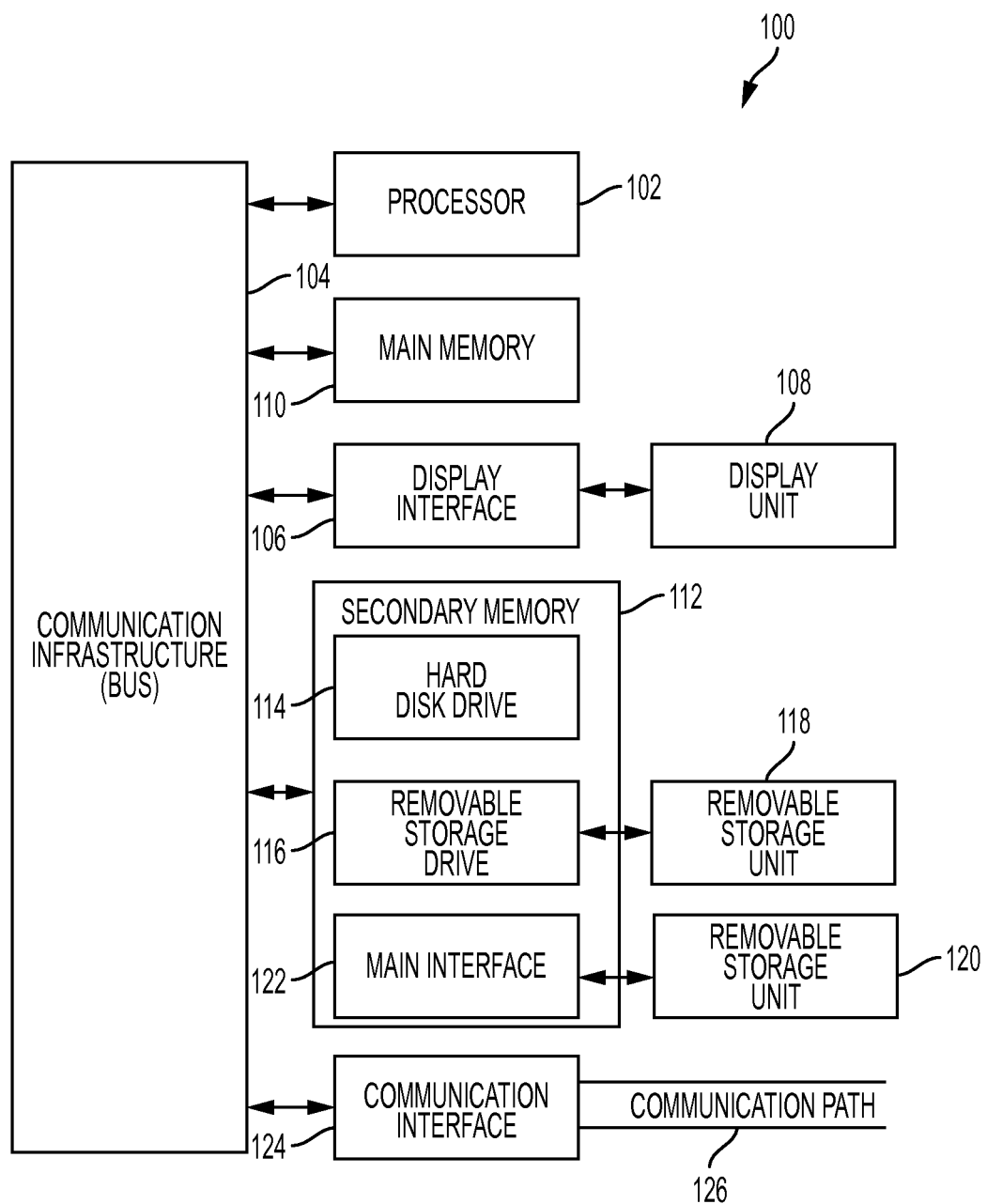
FIG. 1 depicts an exemplary computer system capable of implementing one or more embodiments of the present disclosure.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Omnichannel (OC) retailers share inventory across multiple channels to maximize revenue gain and minimize lost sales and order fulfillment costs. A fixed amount of inventory is produced pre-season and depleted over its lifetime using multiple sales channels across different locations. OC retailers utilize OC-RMS s, which incorporate large, non-linear nonconvex planning models, to develop omnichannel revenue management strategies that optimize prices and inventory over the relevant selling season(s).

OC retailers also utilize OC-RTAs to fulfill orders across multiple channels in real time. OC-RTAs typically select the fulfillment location that minimizes cost-to-serve and lost revenue. Although OC-RTAs receive some longer term, demand-driven price data from OC-RMS s, every order fulfilled by an OC-RTA depletes inventory at a location in a manner that may or may not match the demand forecasts on which the OC-RMS demand-driven prices are based. A related challenge is that, for OC retail operations, the same piece of inventory is potentially sold at different prices, for example, New York versus California brick store prices, web price, mobile channel special prices, catalogue prices, etcetera. The same piece of inventory for a given location and channel may also be discounted over time, or even remain unsold and ultimately end up being disposed of at salvage price. It is therefore a challenge to, in a nonlinear, nonconvex OC retail environment, determine the valuation of a given unit of inventory, and to do with sufficient speed that the unit's inventory valuation may be effectively incorporated into the real time decision engines of a typical OC-RTA. Accordingly, OC-RTAs are not fully revenue aware, which results in margin leak and lost brick sales.

Turning now to an overview of the present disclosure, one or more embodiments provide systems and methodologies for assisting retailers to decide in real-time the most profitable store location from which to deplete inventory in order to meet an incoming e-commerce order. More specifically, one or more embodiments provide systems and methodologies that allow retailers to determine the predicted total lifetime revenue valuation (i.e., "inventory valuation") of a unit of inventory at every location, at any point in time. Known OC retail revenue management systems and e-fulfilment systems, operating without benefit of the present disclosure, operate largely independently of each other, and therefore their fulfilment components are not revenue-aware and are thus unable to provide the above-described inventory valuations. The present disclosure improves the revenue awareness of these systems in real-time using distributed computations to compute the most accurate and up-to-date inventory valuation. Such accurate and up-to-date inventory valuations enable OC retailers to improve the profitability of several of their real-time operations such as product bundling offers, product recommendation systems, dynamic pricing, in addition to enhancing the efficacy as well as the efficiency of their order fulfilment application.

In one or more embodiments, systems and methodologies are provided for updating these inventory valuations frequently because a change in the inventory level at any store location of a OC retailer has not just a local, but a global impact on inventory valuations at all locations. Furthermore, when a retailer is selling bundled products, a change in the inventory level at a location for one product in bundle, affects the valuation of entire bundle of products as well. The disclosed systems and methodologies for updating inventory valuations are particularly useful when the inventory levels in the system are low and the value of the product to customer is relatively high.

The present disclosure improves the revenue awareness of an OC-RTA by synchronizing OC-RMS demand-driven pricing data with the dynamical, real time inventory flows of the OC-RTA in order to provide inventory valuation data that convey the global revenue impact of a real time fulfillment decision at any point in time. In one or more embodiments, a distributed decomposition methodology is used to recover demand-driven inventory valuation data from OC-RMS. The disclosed distributed decomposition methodology includes a sequence of mathematical reformulations and numerical reductions, followed by an application of linear programming (LP) duality, in order to recover true, dynamic inventory valuation data. Access to the inventory valuation data of the present disclosure allows OC-RTAs to maximize overall profitability by managing revenue components such as markdown savings, lost brick sales, channel margin leak, and the like. After every OC fulfillment decision is executed, inventory is depleted, which can change the relevant inventory valuation data at all locations. Accordingly, to account for inventory fluctuations, the disclosed inventory valuation data is periodically re-optimized in near real-time in accordance with the present disclosure. Furthermore, the disclosed reoptimization method improves the quality of the valuation of the inventory in the presence of mathematical "degeneracy," a phenomenon that is typically observed in large-scale practical LP formulations such the one addressed in the omni-channel context. Note that in the presence of degeneracy, the optimal LP dual values may not represent the true shadow prices, and thus may not be the true inventory valuation. On the other hand, the dual values updated by the disclosed reoptimization scheme are less affected by degeneracy.

As previously noted, for any location of a given OC retail operations, the same piece of inventory is potentially sold at different prices, which makes it a challenge to, in a nonlinear, nonconvex OC retail environment, determine the predicted total lifetime revenue valuation of a given unit of inventory. For the non-OC retail operations that use linear planning models, shadow prices are used to assist retailers in making revenue decisions about variably priced inventory by measuring the spot value of inventory measured at the current inventory level of a given location. However, calculating shadow prices from the large, nonlinear nonconvex planning models found in a typical OC-RMS is sufficiently resource intensive and time consuming to make the generation of shadow prices from OC-RMS s impractical for use real time downstream OC support tools such as OC-RTAs.

In one or more embodiments of the present disclosure, the near real time inventory valuation data of the present disclosure may be in the form of a shadow prices in an OC environment, referred to herein as OC shadow prices. The near real time inventory valuation data generated as shadow prices in accordance with the present disclosure are referred to herein as OC shadow prices. The disclosed OC shadow prices provide the valuation of an inventory item across different locations taking into account different channels, prices, inventory levels, and other considerations.

Accordingly, systems and methodologies of the present disclosure start with an unsolvable OC nonlinear nonconvex problem, apply transformations (described in detail below) to the OC nonlinear nonconvex problem to generate a mixed-integer program (MIP) that is a tractable linear nonconvex form, solve the MIP, fix prices at optimal values to achieve dimensionality reduction and eliminate all nonconvexity by eliminating the pricing dimension, obtain inventory flow linear programming (LP) that is linear convex, and solve the LP to recover a dual solution as initial inventory valuations.

Turning now to a more detailed description of the present disclosure, FIG. 1 illustrates a high level block diagram showing an example of a computer-based system 100 useful for implementing one or more embodiments. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional system are in communication via communication path 126, e.g., to communicate data between them.

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, removable storage unit 118 includes a computer readable medium having stored therein computer software and/or data.

In alternative embodiments, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etcetera. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110 and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Figure 2:
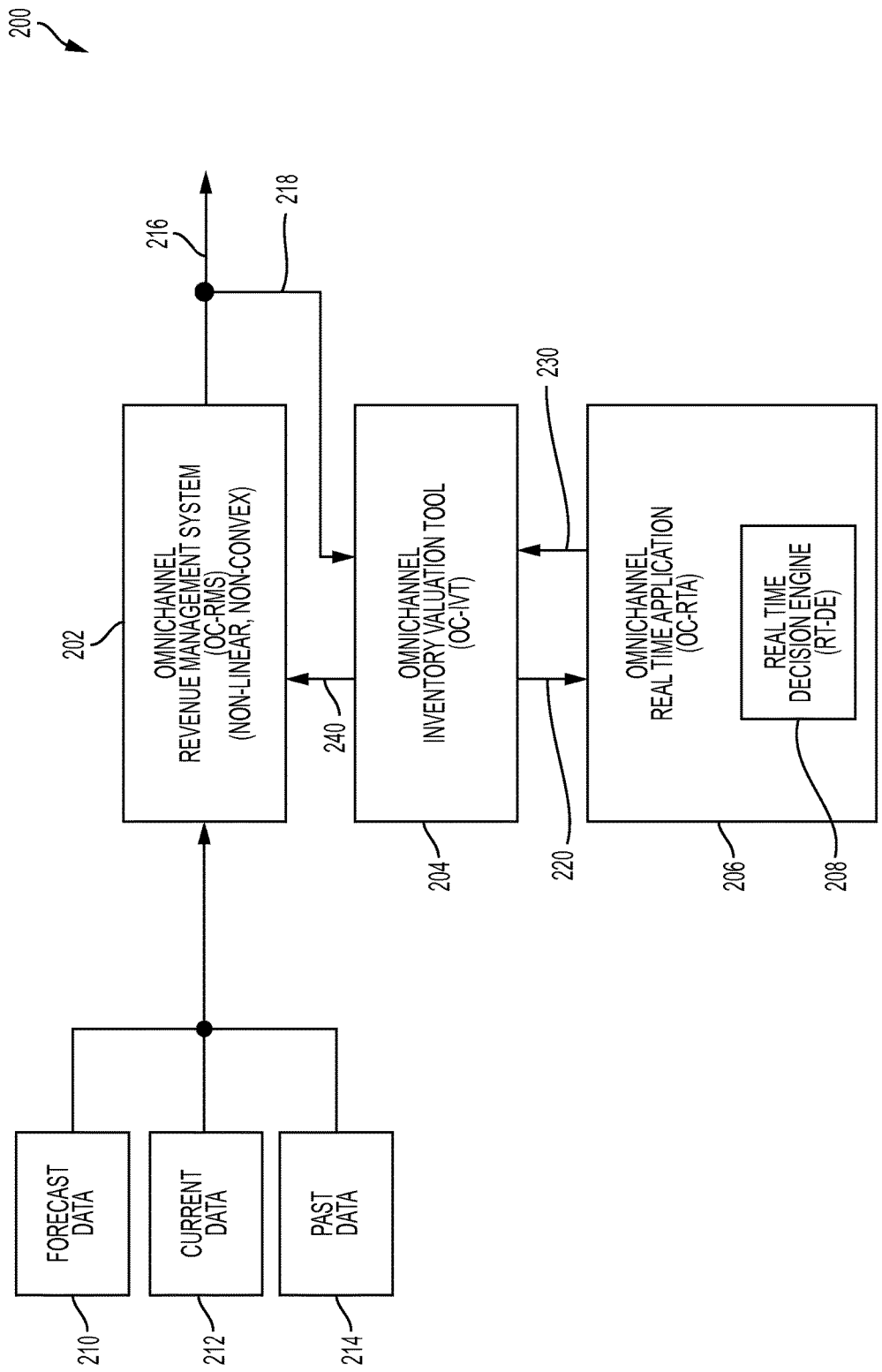
FIG. 2 depicts an omnichannel inventory valuation system according to one or more embodiments of the present disclosure.

FIG. 2 depicts an OC inventory valuation system 200 according to one or more embodiments of the present disclosure. System 200 includes an OC-RMS 202, an OC Inventory Valuation Tool (OC-IVT) 204 and an OC-RTA 206 having a real time decision engine (RT-DE) 208, configured and arranged as shown. Various inputs are provided to OC-RMS 202 including for example forecast data 210, current data 212 and past data 214. OC-RMS is computer-based tool that uses large, nonlinear non-convex planning models to generate an OC revenue management strategy 216 that covers a predefined future period of time (e.g., the next 6 weeks). OC revenue management strategy 216 includes demand-driven inventory pricing data that optimizes prices for the predefined future time period across multiple channels over the product lifecycle.

OC-IVT 204 receives LP-generated (or LP-based) inventory flow decision variables 218, which are taken from OC revenue management strategy 216. OC-IVT 204 solves the LP of inventory flow decision variables 218 to recover the optimal "dual" solution vector. OC-IVT 204 solves the optimal dual solution vector to recover the optimal dual value (including OC shadow prices) at every store location, which provides demand-driven, near-real-time inventory valuation data 220 to OC-RTA 206.

RT-DE 208 performs the core analysis of OC-RTA 206. For example, if OC-RTA 206 is implemented as a warehouse & order management system, RT-DE 208 controls the movement and storage of inventory within a fulfillment warehouse to process the associated transactions, including shipping, receiving, put-away and picking. More specifically, RT-DE 208 tracks inventory and operations of a warehouse, tracks commerce orders and assigns fulfillment plans based on a rule set. According to the present disclosure, RT-DE 208 incorporates demand-driven near-real-time inventory valuation data into its rule set, thereby improving the revenue awareness of OC-RTA 206. With demand-driven near-real-time inventory valuation data incorporated within its rule set, RT-DE 208 maximizes overall profitability by managing revenue components such as markdown savings, lost brick sales, channel margin leak, and the like.

After every OC fulfillment decision is executed by OC-RTA 206, inventory is depleted, which can change the relevant inventory valuation data. Accordingly, to account for inventory fluctuations, a real-time updated data request 230 is periodically provided from OC-RTA 206 to OC-IVT 204. In response to real-time updated data request 230, OC-IVT 204 re-optimizes (i.e., updates) demand-driven near-real-time inventory valuation data 220 based on updated inventory levels, and provides re-optimized demand-driven near-real-time inventory valuation data 220 to OC-RTA 206. Because the timing of inventory flows may not synchronize precisely with the time required to re-optimize inventory valuation data 220, inventory valuation data 220 is updated in near-real-time.

OC revenue management strategy 216 is developed for a predefined future period of time (e.g., the next 6 weeks). Accordingly, a new OC revenue management strategy covering a next predefined period of time is developed prior to the end of each predefined period of time. Periodic update request 240 is provided from OC-IVT 204 to OC-RMS 202 to request the latest inventory flow decision variables 218 whenever they are ready. Accordingly, OC-IVT 204 updates or re-optimizes inventory valuation data 202 in near-real-time in response to RT updated data request 230, and also updates or re-optimizes inventory valuation data 220 in response to receiving and updated version of inventory flow decision variables 218.

Figure 3:
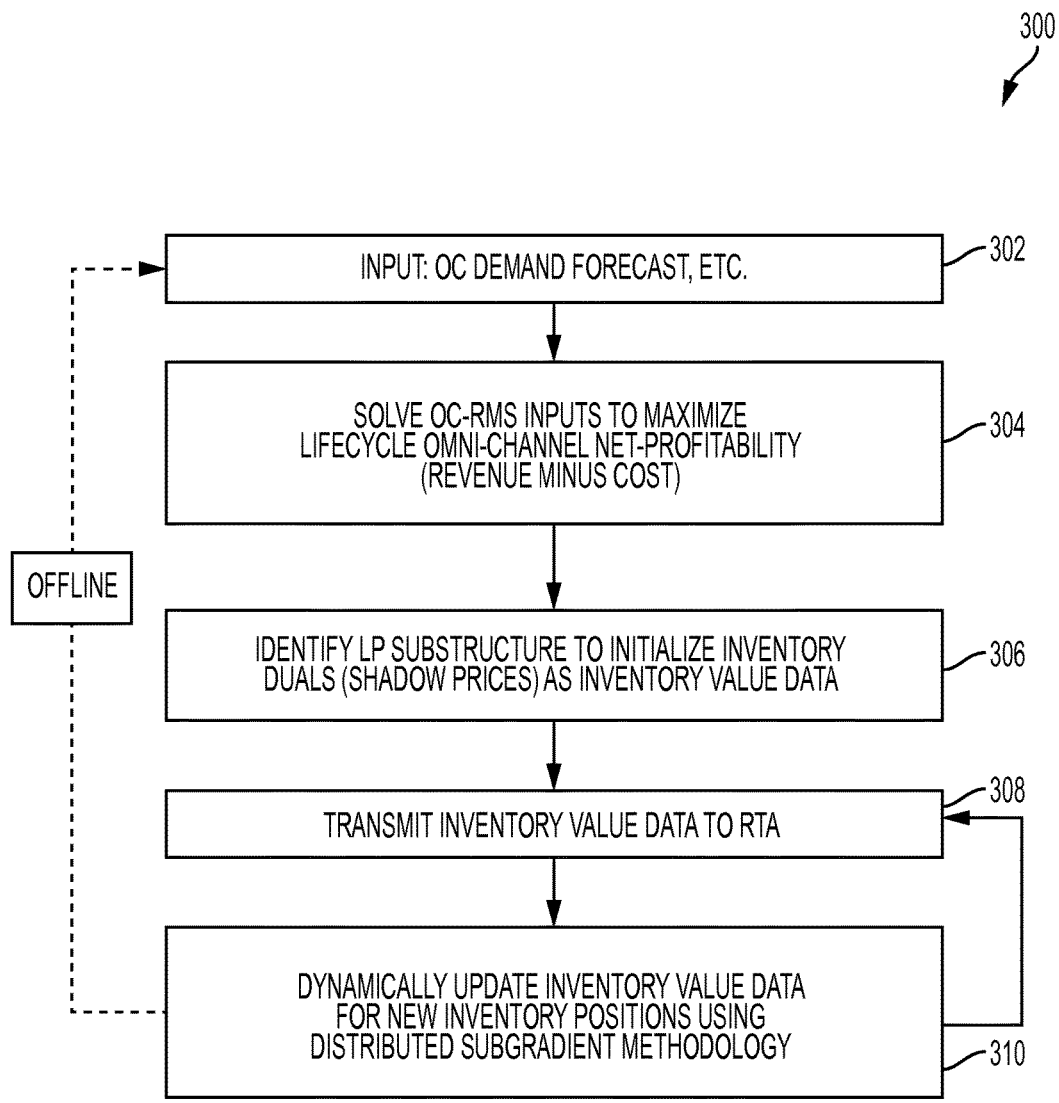
FIG. 3 depicts a flow diagram illustrating a methodology according to one or more embodiment of the present disclosure.

Additional details of the operation of system 200 will now be described with reference to FIG. 2 and FIG. 3, wherein FIG. 3 depicts a flow diagram illustrating a methodology 300 according to one or more embodiment of the present disclosure. Various inputs are provided to OC-RMS 202 including for example forecast data 210, current data 212 and past data 214 (block 302). OC-RMS 202 generates an initial inventory valuation at every location in the retail chain according the following operations (blocks 304, 306), which include multiple mathematical reformulations or transformations. The OC non-linear demand-driven inventory pricing model of OC-RMS 202 is decomposed into multiple linear demand-driven inventory pricing substructure models comprising linear programming problems. This may be accomplished by a first operation of applying user-specified price ladders to transform all nonlinear price responses within OC-RMS 202 into piecewise-linear functions. The second operation is applying additional mathematical reformulations to transform any remaining nonlinearities into a mixed-integer program (MIP) formulation. According to one or more embodiments, the specific reformulations include a "Sherali-Adams" reformulation-linearization technique and a "Charnes-Cooper" transformation. At this stage, all nonlinearities have been eliminated to obtain the resulting MIP, which is linear but still non-convex. Despite the remaining non-convex elements of the resulting MIP, it can still be solved directly in an acceptable amount of time (e.g., typical instances can be solved within a few minutes to hours).

The third operation is solving the resulting MIP using a standard optimization package on high-performance parallel hardware to recover an optimal price trajectory at every store location (including online channels), along with the sequence of expected inventory flows (e.g., from store to customer locations, from warehouses to customer locations, etc.) over several future time periods. At this stage, the optimal price trajectory at every store location and the sequence of expected inventory flows make up a significant portion of the OC revenue management strategy 216. The fourth operation is setting the prices at the optimal price-trajectory values, which is, in effect, a linear program (LP) having only inventory flow decision variables. This LP-generated inventory flow based on the optimal OC-RMP prices is LP-based inventory flow decision variables 216, which are provided to OC-IVT 204.

OC-IVT 204 solves LP-based inventory decision variables 218 to recover the optimal dual solution vector and determine the optimal dual value at every store location, which provides the initial value of demand-driven, near-real-time inventory value data 220 (block 306). OC-IVT 204 transmits demand-driven, near-real-time inventory value data 220 (block 308) to OC-RTA 208. RT-DE 208 dynamically updates inventory value data 220 for new inventory positions by using a distributed subgradient methodology to periodically generate real time updated data request 230 (block 310). In response to real-time updated data request 230, OC-IVT 204 re-optimizes (i.e., updates) demand-driven near-real-time inventory value data 230 based on updated inventory levels, and provides re-optimized demand-driven near-real-time inventory value data 230 to OC-RTA 206.

FIG. 4 depicts details of the operation of OC-IVT 204 (shown in FIG. 2) and block 306 of methodology 300 (shown in FIG. 3) in determining initial values of near real time inventory value data 220. Similarly, FIG. 5 depicts additional details of the operation of OC-IVT 204 and block 310 of methodology 300 in performing a column generated scheme for updating OC inventory value data 220 in response to real-time updated data request 230. The column generation scheme shown in FIG. 5 includes initialization of shadow prices, preprocessing of columns, column generation/pricing, computer inventory constraint violations and updating the dual vector "E."

The LP substructure (e.g., LP-based inventory flow decision variables 218) extracted after the reformulations, mathematical transformations, solving, and then numerical reductions by fixing of prices at their optimal values, can be solved periodically offline to recover an exact and optimal dual solution (e.g., inventory value data 220). In particular, the optimal dual variable values, in the absence of degeneracy, associated with the inventory constraints at the brick stores and e-fulfilment centers represent the initial shadow prices of inventory across the retail chain.

Solving the LP substructure using standard optimization solver packages is impractical for a real-time environment where millisecond response times are needed, for example, to re-optimize inventory value data 220 after an e-fulfilment request is executed and real time updated data request 230 is sent to OC-IVT 204. This re-optimization is necessary because local change (e.g., through inventory depletion) have a global impact on shadow prices everywhere else. For example, if there are 1000 locations, there are a million location-to-location ship-from-store (SFS) possibilities that have to be managed.

By recognizing the mathematical structure of OC-RMS 202 that is special to omni-channel operations, the present disclosure proposes a novel, solver-free approach, which includes the operations (a) through (d) described in the following paragraphs, and illustrated in FIG. 5.

(a) Identify the special mathematical structure of OC-RMS 202—recognize that inventory at a given location is shared between the various sales channels in an omni-channel environment, and this can be modeled as a linear inventory-sharing constraint.

(b) Manage the global impact of a local inventory-sharing OC-RMS 202 constraint—whereas the LP substructure has several constraints, if the constraint (a), which complicates and affects the inventory valuation at all locations, is temporarily relaxed (or ignored), the resultant LP substructure decomposes in several smaller and independent problems that are simple enough to be solved easily and quickly to recover a shadow price.

(c) Iterative refinement of shadow prices—however, the inventory-sharing constraint at one or more locations can be violated by a solution thus obtained in (b), which can result in a poor or meaningless shadow prices. Toward this end, a known subgradient update is employed to iteratively reduce this violation within the user-specified response time requirement, and at each iteration of the update an improved shadow price value is obtained. This update does not require any matrix inversion subroutines and employs only simple arithmetic operations, and is thus very fast. Furthermore, this update procedure performs better in the presence of degeneracy when compared to standard LP solvers, and is likely to produce a more accurate estimate of shadow prices (i.e., inventory valuation data 220).

(d) A final computational challenge is deciding which of the many SFS possibilities to turn on. By recognizing that a vast majority of these will be inactive in an optimal solution, a column generation scheme (shown in FIG. 5) is employed that calculates and uses only a small, active subset of the most promising SFS possibilities to iteratively solve the LP substructure using (c), thereby achieving a significant dimensionality reduction. Furthermore, all calculations required in (c) and (d) can be conveniently sped up to support real-time operations using distributed computing by noting that they can be independently performed at every location in the retail chain, and then be recombined to yield the final solution.

FIG. 6 depicts a table that summarizes the impact of demand-driven inventory valuation data on different revenue components according to one or more embodiments of the present disclosure. As shown, the access to demand-driven near-real-time inventory value data 220, which, when updated, takes the form of OC shadow prices, allows better real time management of at least three revenue components, namely markdown savings, lost brick sales and channel margin leak.

Embodiments of the present disclosure may be also be utilized to provide decision support for dynamic bundling/demand shaping. For example, an OC retailer may have multiple bundling alternatives to sell to a potential customer on-demand, which may be equivalent from a customer perspective. The retailer could use the disclosed system and methodology to calculate the sum of the individual shadow prices to then calculate the total shadow price of each bundle, thereby allowing the OC retailer to select the bundle with the lowest inventory value. By adopting the disclosed method, an OC retailer can preserve more highly-valued inventory for future customers willing to pay a premium for that specific product.

Embodiments of the present disclosure may also be utilized to provide decision support for dynamic pricing/request-for-quote scenarios. For example, a win-probability based model is often used to suggest a selling price (P) on-demand, where the value U, and cost (C) of the item being sold is a key input. Under this scenario, win probability $W(U)=EXP(U)/(1+EXP(U))$. Additionally, U= f(P, C, ... ), which may be implemented as $U=\alpha-\beta*(P-C)$, wherein $\alpha$, $\beta>0$, are pre-calculated numerical coefficients. Finally, "optimal price"=max $(P-C)*W(U)$. An OC retailer can increase/decrease the win-probability by lowering/raising the optimal price. By replacing the static cost C with a dynamic shadow price E to valuation (e.g. $U=\alpha-\beta*(P-E)$), the OC retailer can maximize true profitability Thus, it can be seen from the forgoing detailed description that embodiments of the present disclosure provide technical benefits. One or more embodiments provide systems and methodologies for integrated multi-period omnichannel revenue management. According to one or more embodiments, an OC revenue management system (e.g., nonlinear, nonconvex planning model) is synchronized with OC real-time applications that provide quick response times (e.g., OC warehouse & order fulfillment systems). By synchronizing these two OC systems, profitability can be maximized by providing OC real time applications with sufficient pricing data to allow order fulfillment to be executed in a manner that preserves high value inventory, clears low value inventory and reduces shortages. This transforms OC revenue management systems and OC real-time applications into multi-period nonconvex, dynamically updatable LP real-time operations. OC shadow prices are therefore generated and updated in real-time.

The disclosed system includes an OC pricing recommender, an OC inventory valuation update tool and an OC real-time decision support tool. The OC inventory valuation update tool fixes the prices of the omnichannel pricing and dynamically calculates the value of the inventory at every store, warehouse, and/or e-commerce order fulfillment location in an OC retail chain. The OC real-time decision support tool uses the value of inventory to make real-time decisions, including real-time fulfillments and product marketing.

The disclosed method includes inputting external or OC demand forecast and solving the large, nonlinear, nonconvex planning models to maximize the lifecycle OC net-profitability (revenue minus cost). The methodology further includes identifying the LP substructure to initialize inventory duals (or OC shadow prices). Data of the OC shadow prices are then transmitted to OC real-time applications and the OC shadow prices are dynamically updated for new inventory positions using a column generation scheme.

Figure 7:
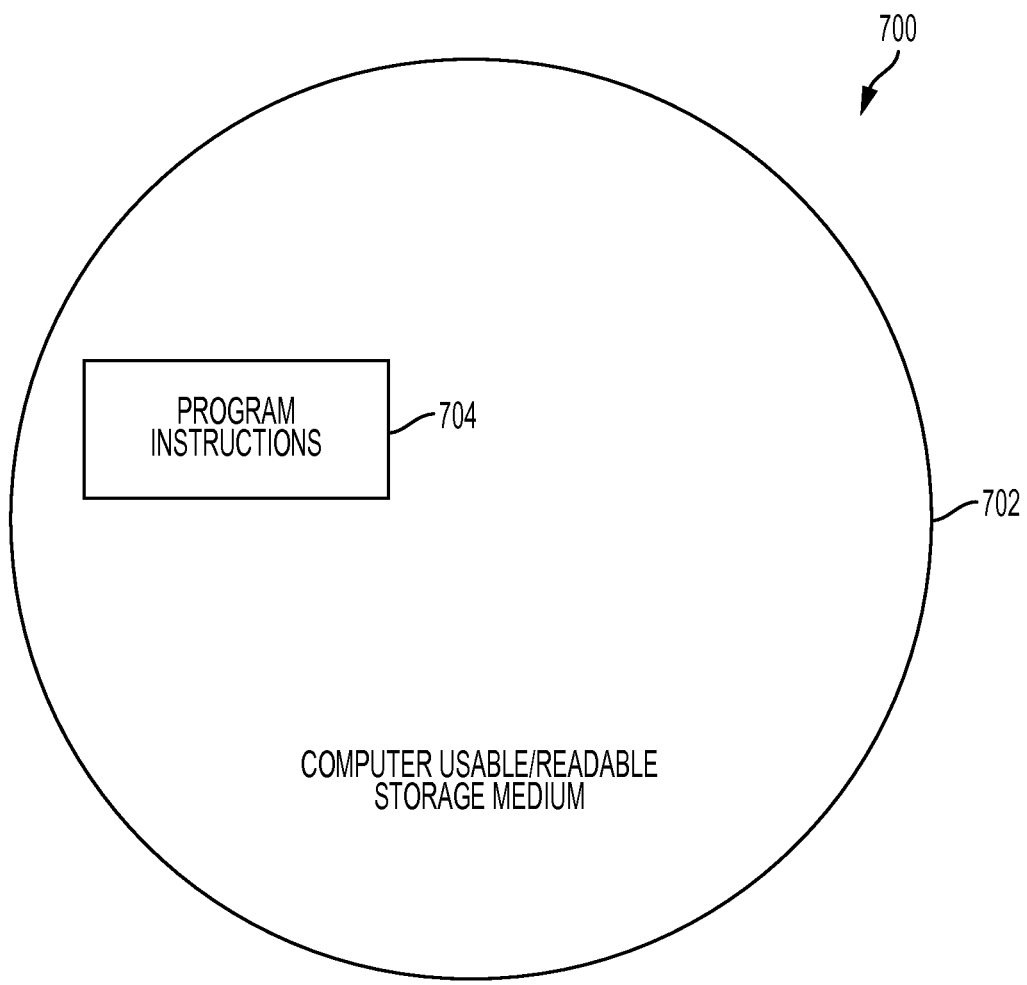
FIG. 7 depicts a computer program product according to one or more embodiments of the present disclosure.

Referring now to FIG. 7, a computer program product 700 in accordance with an embodiment that includes a computer readable storage medium 702 and program instructions 704 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. An omnichannel (OC) inventory control system of generating inventory valuation data for an OC retail operation comprising:
    an OC retail management system comprising non-linear non-convex planning models configured to generate an OC revenue management strategy which includes an OC non-linear demand-driven inventory pricing model having first pricing and inventory flow decision variables covering a first predetermined time period, wherein the OC retail management system reformulates the OC non-linear demand-driven inventory pricing model to transform all non-linear price responses within the OC non-linear demand-driven inventory pricing model into a mixed-integer program (MIP) formulation, and solves the MIP formulation numerically to generate numerical price values and set values of the pricing decision variables equal to the numerical price values to eliminate non-convexity and reduce dimensionality of the OC non-linear demand-driven pricing model into a linear programming problem;
    an OC inventory valuation tool communicatively coupled to the OC retail management system configured to receive the linear programming problem and apply a linear programming solver to the linear programming problem to recover initial valuations of inventory at every location of every channel of the OC retail operation and provide demand-driven, near-real-time inventory valuation data; and
    an OC real-time application communicatively coupled to the OC inventory valuation tool and receiving the demand-driven, near-real-time inventory valuation data, wherein the OC real-time application comprises a real-time decision engine configured to assign order fulfillment instructions that execute order fulfillment plans based on a rule set which incorporates the demand-driven, near-real-time inventory valuation data, wherein the demand-driven near-real-time inventory valuation data comprises the initial valuations of inventory at every location of every channel of the OC retail operation;
    wherein the OC real-time application is configured to periodically provide update requests and updated inventory level data to the OC inventory valuation tool and in response to receiving each of the update requests and the updated inventory level data, the OC inventory valuation tool providing updated demand-driven, near-real-time inventory valuation data to the OC real-time application based at least in part on the updated inventory level data;
    wherein the real-time decision engine is further configured to incorporate each of the updated demand-driven near-real-time inventory valuation data into the rule set; and
    wherein the updated demand-driven near-real-time inventory valuation data comprises optimal valuations of inventory at every location of every channel of the OC retail operation despite the presence of degeneracy of the OC retail operation.

2. The system of claim 1, wherein the rule set comprises determining an order fulfillment location based at least in part on the initial valuations of inventory at every location of every channel of the OC retail operation.

3. The system of claim 1, wherein the initial valuations of inventory at every location of every channel of the OC retail operation comprise dual values associated with OC shared inventory constraints.

4. The system of claim 3, wherein the updated initial valuations of inventory at every location of every channel of the OC retail operation comprises OC shadow price data.

5. The system of claim 1, wherein the OC inventory valuation tool is further configured to generate the updated valuations of inventory at every location of every channel of the OC retail operation by performing a column generation methodology.

6. The system of claim 1, wherein the OC inventory valuation tool is further configured to generate the initial valuations of inventory at every location of every channel of the OC retail operation within the predetermined time period.

7. A method of operating an omnichannel (OC) inventory control system of generating inventory valuation data for an OC retail operation, the method comprising:
  generating, using an OC retail management system comprising non-linear non-convex planning models, an OC revenue management strategy which includes an OC non-linear demand-driven inventory pricing model having first pricing and inventory flow decision variables covering a first predetermined time period, wherein the OC retail management system reformulates the OC non-linear demand-driven inventory pricing model to transform all non-linear price responses within the OC non-linear demand-driven inventory pricing model into a mixed-integer program (MIP) formulation, and solves the MIP formulation numerically to generate numerical price values and set values of the pricing decision variables equal to the numerical price values to eliminate non-convexity and reduce dimensionality of the OC non-linear demand-driven pricing model into a linear programming problem;
  extracting, using an OC inventory valuation tool communicatively coupled to the OC retail management system, the linear programming problem and applying a linear programming solver to the linear programming problem to recover initial valuations of inventory at every location of every channel of the OC retail operation and provide demand-driven near-real-time inventory valuation data;
  incorporating, using a real-time decision engine of an OC real-time application, the demand-driven near-real-time inventory valuation data into a rule set, wherein the OC real-time application is communicatively coupled to the OC inventory valuation tool; and
  assigning, using the real-time decision engine, order fulfillment plans based on the rule set which incorporates the demand-driven, near-real-time inventory valuation data, wherein the demand-driven near-real-time inventory valuation data comprises the initial valuations of inventory at every location of every channel of the OC retail operation;
  wherein the OC real-time application is configured to periodically provide update requests and updated inventory level data to the OC inventory valuation tool and in response to receiving each of the update requests and the updated inventory level data, the OC inventory valuation tool providing updated demand-driven, near-real-time inventory valuation data to the OC real-time application based at least in part on the updated inventory level data;
  wherein the real-time decision engine is further configured to incorporate each of the updated demand-driven near-real-time inventory valuation data into the rule set; and
  wherein the updated demand-driven near-real-time inventory valuation data comprises optimal valuations of inventory at every location of every channel of the OC retail operation despite the presence of degeneracy of the OC retail operation.

8. The method of claim 7, wherein the rule set comprises determining an order fulfillment location based at least in part on the initial valuations of inventory at every location of every channel of the OC retail operation.

9. The method of claim 7, wherein the initial valuations of inventory at every location of every channel of the OC retail operation comprise dual values associated with OC shared inventory constraints.

10. The method of claim 9, wherein the updated initial valuations of inventory at every location of every channel of the OC retail operation comprises OC shadow price data.

11. The method of claim 7 further comprising generating, using the OC inventory valuation tool, the updated valuations of inventory at every location of every channel of the OC retail operation by performing a column generation methodology.

12. The method of claim 7 further comprising generating, using the OC inventory valuation tool, the initial valuations of inventory at every location of every channel of the OC retail operation within the predetermined time period.

13. A computer program product for operating an omnichannel (OC) inventory control system of generating inventory valuation data for an OC retail operation, the computer program product comprising:
  a non-transitory computer readable storage medium having program instructions embodied therewith, wherein the program instructions are readable by a processor system to cause the processor system to perform a method comprising:
  generating, using an OC retail management system comprising non-linear non-convex planning models, an OC revenue management strategy which includes an OC non-linear demand-driven inventory pricing model having first pricing and inventory flow decision variables covering a first predetermined time period, wherein the OC retail management system reformulates the OC non-linear demand-driven inventory pricing model to transform all non-linear price responses within the OC non-linear demand-driven inventory pricing model into a mixed-integer program (MIP) formulation, and solves the MIP formulation numerically to generate numerical price values and set values of the pricing decision variables equal to the numerical price values to eliminate non-convexity and reduce dimensionality of the OC non-linear demand-driven pricing model into a linear programming problem;
  extracting, using an OC inventory valuation tool communicatively coupled to the OC retail management system, the linear programming problem and applying a linear programming solver to the linear programming problem to recover initial valuations of inventory at every location of every channel of the OC retail operation and provide demand-driven near-real-time inventory valuation data;

incorporating, using a real-time decision engine of an OC real-time application, the demand-driven near-real-time inventory valuation data into a rule set, wherein the OC real-time application is communicatively coupled to the OC inventory valuation tool; and assigning, using the real-time decision engine, order fulfillment plans based on the rule set which incorporates the demand-driven, near-real-time inventory valuation data, wherein the demand-driven near-real-time inventory valuation data comprises the initial valuations of inventory at every location of every channel of the OC retail operation;

wherein the OC real-time application is configured to periodically provide update requests and updated inventory level data to the OC inventory valuation tool and in response to receiving each of the update requests and the updated inventory level data, the OC inventory valuation tool providing updated demand-driven, near-real-time inventory valuation data to the OC real-time application based at least in part on the updated inventory level data;

wherein the real-time decision engine is further configured to incorporate each of the updated demand-driven near-real-time inventory valuation data into the rule set; and wherein the updated demand-driven near-real-time inventory valuation data comprises optimal valuations of inventory at every location of every channel of the OC retail operation despite the presence of degeneracy of the OC retail operation.

* * * * *